Jan. 29, 1924. 1,482,366
A. H. NELLER
ANIMAL LEADING DEVICE
Filed July 14, 1922    2 Sheets-Sheet 1
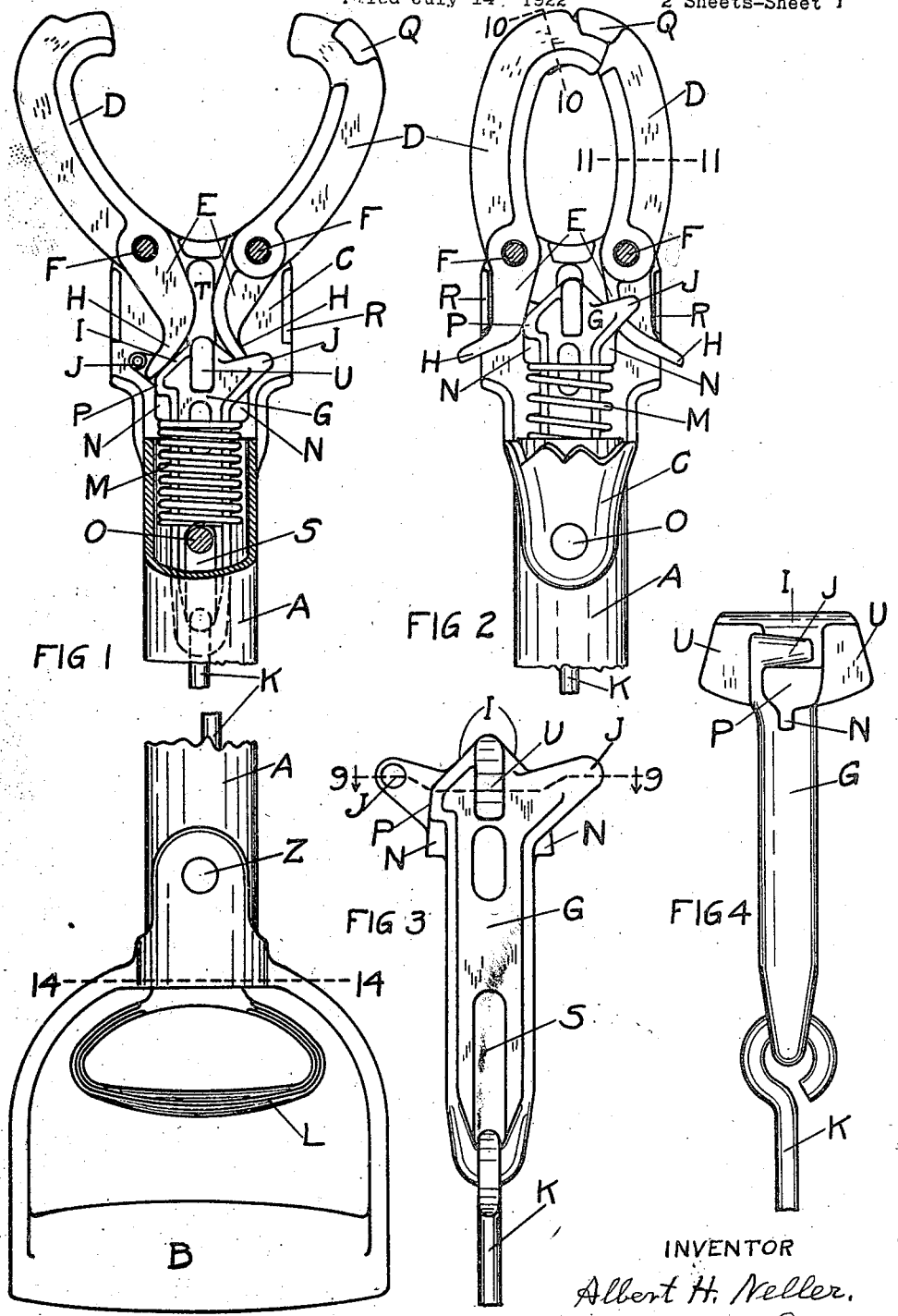
INVENTOR
Albert H. Neller.
William Louden,
ATTORNEY Jan. 29, 1924. 1,482,366
A. H. NELLER
ANIMAL LEADING DEVICE
Filed July 14, 1922  2 Sheets-Sheet 2
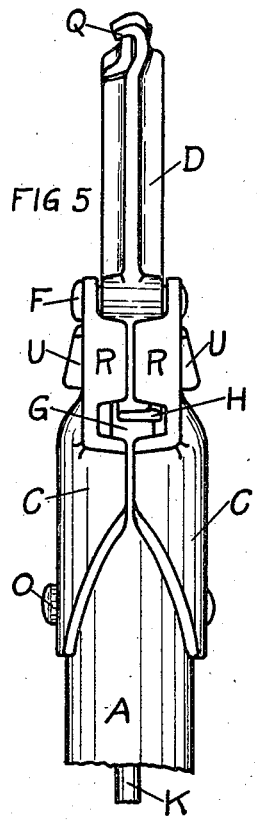
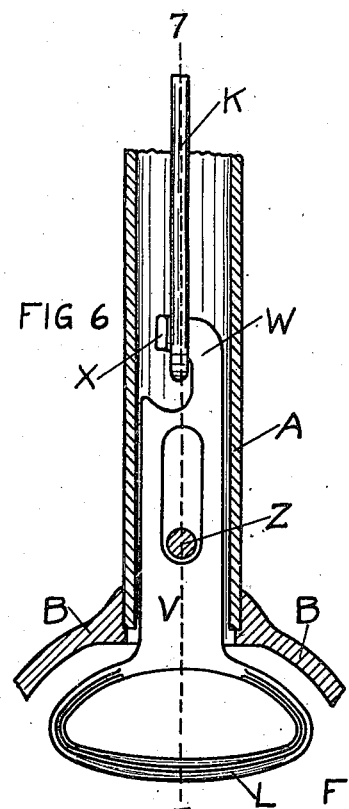
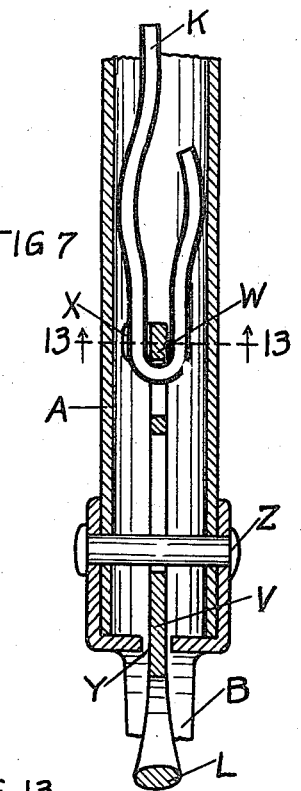
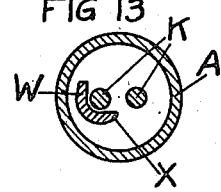
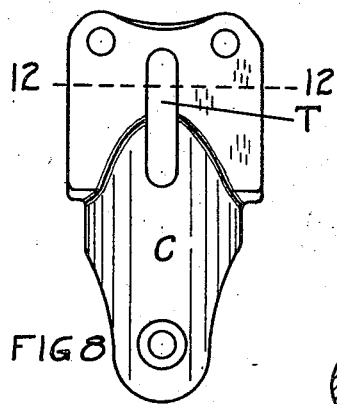
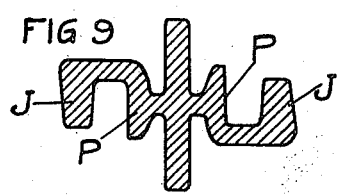
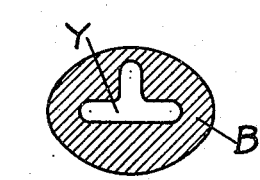
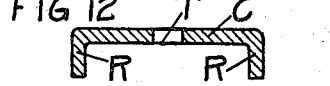
INVENTOR
Albert H. Neller,
William Louden,
ATTORNEY Patented Jan. 29, 1924.

1,482,366

UNITED STATES PATENT OFFICE.

ALBERT H. NELLER, OF FAIRFIELD, IOWA, ASSIGNOR TO THE LOUDEN MACHINERY COMPANY, OF FAIRFIELD, IOWA, A CORPORATION OF IOWA.

ANIMAL-LEADING DEVICE.

Application filed July 14, 1922. Serial No. 575,071.

*To all whom it may concern:*

Be it known that I, ALBERT H. NELLER, a citizen of the United States, residing at Fairfield, in the county of Jefferson and State of Iowa, have invented a new and useful Improvement in Animal-Leading Devices, of which the following is a specification.

My invention relates to certain improvements in devices for leading bulls or other animals, a ring being inserted in the animal's nose and an elongated staff being used, said staff having means to catch and hold the ring and thus lead the animal and means to release the ring and thus release the animal: and it consists primarily of an improvement in the construction and arrangement of the means to catch and hold the ring and also of the means for releasing the ring, whereby the ring may be more easily and quickly engaged, and also, be more easily and quickly released and at the same time will more securely hold the ring until it is intentionally released. Also, of other improvements in the details of construction which will be described herein, and which will be more definitely set forth in the claims.

In the accompanying drawings forming a part of this specification, Fig. 1 is a side elevation of an animal leading device embodying my invention—showing the means for holding the ring in open position at one end of a staff and a handle at the other end of the staff, an outer part of the structure being broken away to show inner portions, and the central portion of the staff being cut away to shorten the figure. Fig. 2 is a similar view of the holding end of the staff, showing the holding means in closed position, the outer part before mentioned being partially broken away. Figs. 3 and 4 are enlarged detail views of an operating part, the former being a side view and the latter, an edge view of the part. Fig. 5 is an edge view of the holding end of the staff when in closed position. Fig. 6 is a side view of the releasing means at the handle end of the staff, the portion of the staff containing the same being shown in longitudinal section.

Fig. 7 is a longitudinal section on line 7—7 of Fig. 6, the broken away portion of Fig. 6 being replaced to make it complete. Fig. 8 is a detail view. Fig. 9 is a transverse section on line 9—9 of Fig. 3. Figs. 10 and 11 are enlarged transverse sections on lines 10—10 and 11—11 respectively of Fig. 2. Fig. 12 is a transveres section on line 12—12 of Fig. 8. Fig. 13 is a transverse section on line 13—13 of Fig. 7, looking in the direction of the arrow, the cut away portion of Fig. 7 being replaced to make the structure complete, and one of the parts being in a different position, as will be hereafter explained. Fig. 14 is a transverse section on line 14—14 of Fig. 1.

Referring to the drawings, A is what may be called the staff which is preferably a piece of tubing of suitable length for the purpose intended. On one end of the staff is a handle B and on the other end are two mating castings C, the casting on the near side of Fig. 1 being entirely removed and the one on the near side of Fig. 2 being partly cut away. Between the outer ends of the castings C and on opposite edges thereof a pair of co-acting grappling hooks D are pivoted, the outer ends of which hooks are adapted to be spread apart, as shown in Fig. 1, and moving on their pivots, their outer ends are adapted to come together, and to become locked in closed position, as shown in Fig. 2. When locked in closed position, the hooks will securely hold a ring in an animal's nose. When in open position a bull ring may be easily and quickly caught by the open hooks, which can be as easily and quickly closed and locked in closed position to hold it, and then may be as easily and quickly opened to release the ring.

To open and close the grappling hooks D, their inner ends E are extended down within their pivots F in a direction approximately parallel with the castings C and an operating member G is stationed within the end of the staff A between the inner ends of the hooks. By moving this operating member inwardly and outwardly the hooks will be opened and closed. This is preferably accomplished by forming outwardly and downwardly inclined points H on the extreme ends of the inner portion E of the hooks which will be engaged on the inner and lower sides by a double faced cam I on the upper end of the operating member G. The cam will spread the ends E apart when the member G is moved outward which will close the outer ends of the hooks as shown in Fig. 2. The member G is also provided with laterally disposed lugs J which, when the member is drawn inwardly, or away from the end having the hooks D, will engage the outer and upper sides of the points H, and will draw them together, thereby moving the hooks on their pivots F and opening their outer ends as shown in Fig. 1.

To operate the member G, means, preferably a wire K, is connected to its inner end and is extended through the tubing forming the staff where it is provided with or connected to an eye or loop L. The operator by inserting one or more fingers in this eye or loop, and pulling on it, will draw the member G inwardly and the inner ends of the hooks will be drawn together and their outer ends will spread apart, or in other words, will be opened, as shown in Fig. 1. As shown in Figs. 1 and 2, a coiled extension spring M is placed on the member G, with one end resting against shoulders N on the member, and the other end resting against the rivet or bolt O which joins the inner ends of the castings C to the staff A.

In pulling out the eye or loop L to open the hooks, the spring M will be compressed, as shown in Fig. 1, and when the eye or loop is released the tension of the spring will press the member G in the opposite direction and will force the cam I in between the inner ends E of the hooks, and will close their outer ends, as shown in Fig. 2. Below the faces of the cam I the sides P of the member G are approximately parallel with each other, and these sides being forced by the tension of the spring between the inner sides of the extended ends E will securely hold them apart and the outer ends of the hooks D will thereby be locked in closed position. The ends of the hooks are arranged to lap on each other and are provided with overlapping flanges Q, as shown most plainly by transverse section in Fig. 10. By this means the ends of the hooks D will be securely held together, and cannot be laterally spread apart.

The member G is provided with a slot S through which the rivet or bolt O is passed, thereby limiting the movement of the member G to the necessary extent, and thus preventing the lugs J from being drawn out of engagement with the outstanding points H of the hooks D. The inner portions of the castings C are rounded to fit the contour of the staff A. Their outer portions are made flat to permit the movement of the lower ends E of the hooks in the space between them. They are preferably fitted with inturned flanges R to partially close this space, an opening being left on each side to permit the outward movement of the points H.

The castings are also provided with a longitudinally disposed central slot T through which flanges U on opposite sides of the head of the member G are projected, as shown in Fig. 5. The flanges are preferably tapered as shown in Figs. 4 and 5, with their edges slightly rounded, whereby the operator by taking hold of them between his thumb and a finger may draw the member G inward and thus open the hooks without pulling on the loop or eye L, it sometimes being advantageous to open the hooks from this end of the staff. These flanges, being tapered and projecting but slightly outward, are not liable to be prematurely operated by coming in contact with some adjacent object, and at the same time may be easily operated by catching them between the thumb and finger of the operator, which is more easily done than if the member projected out on one side only.

It is important that the loop or eye L be made large enough for the operator to insert two or three fingers therein, and sometimes with a glove or mitten on his hand. When a wire alone is used to operate the member G it is not practical to have the loop enlarged, because it must be small enough to pass through the tubing of which the staff is formed, and through a slot in the handle B at the end of the tubing which cannot be wider than the inside diameter of the tubing. To overcome this difficulty I use what may be called a trip or releasing member V which is provided with an enlarged loop or eye L, and this trip or releasing member is connected to the wire K, preferably in the following manner.

The trip V is preferably made of malleable iron and is provided with a hook W on its inner end, having a laterally extended point X standing at substantially right angles to the body of the hook and approximately in its center. A hook is formed on the adjacent end of the wire, as shown in Fig. 7. The space in the end of the wire hook is essentially narrow or contracted, but the point of the wire forming the hook, and also the portion of the wire opposite, is spread out to some extent, so that when inserted in the tubing these parts will come in close proximity to the wall of the tubing, and will hold the end of the hook approximately in the center of the tubing, as shown in Fig. 7.

The end of the trip V having the hook W and laterally extended point X is inserted in a slot in the handle, as shown by Y in Figs. 7 and 14 and is then passed into the end of the tubing, the adjoining part of the handle being placed on the outside of the tubing, and the rivet or bolt Z to connect the handle to the tubing not yet being inserted. The trip V is inserted in the tubing in such a position that when the hook W comes in contact with the hook on the wire K, the laterally disposed point X will be on one side of the hook as most plainly shown in Fig. 13, and then by turning the handle B and the trip V one quarter around the laterally disposed point X will enter the space in the end of the wire hook, and by turning the handle and trip another quarter around the central portion of the trip hook W will enter the space in the hook of the wire, and the lateral point X will occupy a position at one side of the wire, as shown in Figs. 6 and 7, which will prevent the hook of the wire from getting off the hook of the trip.

When in its position the rivet or bolt Z will be inserted and the handle B will be attached to the staff and the trip V will be held in the proper position to prevent it from being disconnected from the wire K. As shown in Fig. 6, there is a slot in the body of the trip V through which the bolt or rivet Z is passed, which may be used to limit the movement of the trip to correspond with the movement of the member G. By pulling on the loop or eye L of the trip V the hooks D may be easily and quickly opened to catch a ring in the nose of an animal or to release the ring therefrom. By releasing the loop or eye the spring M will quickly and surely close the hooks D on the ring, and will lock them in closed position thereon.

The slot Y is the portion of the handle B covering the end of the tubing to which it is applied, as shown in Fig. 14, and it will prevent the trip V from turning and becoming disconnected from the wire K. It is preferable that the slot Y should have a laterally disposed portion, as shown, to more freely admit the laterally disposed point X. Otherwise the slot would have to be wider to admit this point in assembling the part and if so made it would not hold the trip so accurately in position.

What I claim is:

1. In an animal leading device, an elongated tubular staff, a pair of mating castings secured to one end of the staff on opposite sides thereof, a pair of co-acting grappling hooks pivoted on opposite edges of and within said castings; a handle secured to the opposite end of the tubular staff, a longitudinally movable member within said tubular staff having one end extended to the handle on the staff, and the other end connected to the grappling hooks and adapted to be rapidly moved in opposite directions to alternately open and close said hooks and means to normally hold said member in the position it assumes when the hooks are in closed position, substantially as set forth.

2. In an animal leading device, an elongated tubular staff, a pair of mating castings secured to one end of the staff on opposite sides thereof, a pair of co-acting grappling hooks pivoted on opposite edges of and within said castings, said hooks having inwardly extended ends inside of their pivots; a handle secured to the opposite end of the tubular staff, a longitudinally movable member within said tubular staff having one end extended to the handle on the staff, and the other end connected to the inwardly extended ends of the grappling hooks and adapted to be rapidly moved in opposite directions to alternately open and close said hooks, and means to normally hold said member in the position it assumes when the hooks are in closed position, substantially as shown and described.

3. In a device of the character described, a staff, a pair of grappling hooks pivoted on one end of the staff so their outer ends may be opened and then be closed together, and means to open and close said hooks, the outer ends of the hooks being adapted when closed to lap on each other, and a flange on each hook adapted to catch over the point of the other hook, whereby lateral displacement of the hooks will be prevented.

4. In a device of the character described, a single unsurrounded staff, a pair of grappling hooks pivoted on one end of the staff so their outer ends may be opened, and then be closed together, extensions on said hooks inside of their pivots projecting inwardly on lines approximately parallel with the staff, a movable member having one end inserted between the extensions and adapted to contact with their inner sides, also means on said member adapted to come in contact with the outer sides of the extensions, and means to move the member in opposite directions, whereby, when the member is moved inwardly, the extensions will be drawn together and the outer ends of the hooks will be spread apart, and when the member is moved outwardly, the extensions will be spread apart, and the outer ends of the hooks will be drawn together.

5. In a device of the character described, a staff, a pair of grappling hooks pivoted on one end of the staff so their outer ends may be opened and then be closed together, extensions on said hooks inside of their pivots, a movable member having a double faced cam on one end, inserted between the extensions, laterally disposed lugs on said member adapted to contact with the outer sides of the extensions, and means to move the member in opposite directions, whereby, when the member is moved inwardly the extensions will be drawn toward each other by the laterally disposed lugs, and the outer ends of the hooks will be opened, and when the member is moved outwardly, the extensions will be spread apart by the cam, and the outer ends of the hooks will be closed.

6. In a device of the character described, a staff, a handle on one end of the staff, a pair of mating castings on the other end of the staff, said castings having inwardly meeting flanges on their opposite edges, a pair of hooks pivoted between the outer corners of the castings beyond the flanges, so their outer ends may be spread apart and drawn together, and means to open and close the hooks substantially as set forth.

7. In a device of the character described, a staff, a handle on one end of the staff, a pair of mating castings on the other end of the staff, each casting having a longitudinally disposed centrally located slot in its body, a pair of hooks pivoted between the outer corners of the castings so their outer ends may be spread apart and drawn together, an operating member located in the staff and connected to the hooks so as to operate them in opposite directions, and laterally disposed flanges on the operating member projected out through the slots in the castings on the opposite sides, whereby the operating member may be moved inwardly by taking hold of said laterally projected flanges.

8. In a device of the character described, a tubular staff; a handle on one end of the staff; means on the other end of the staff for alternately holding and releasing a ring in an animal's nose; an operating member located in the staff and adapted to operate said holding and releasing means; a wire connected to said member and leading to the opposite end of the staff; an elongated hook on the free end of the wire; and a trip having an enlarged loop on one end, and a hook on the other end, the end of the trip having the hook being inserted in the end of the staff having the handle, and the hook on the trip then being connected to the hook on the wire, substantially as described.

9. In a device of the character described, a tubular staff; a handle on one end of the staff; means on the other end of the staff for alternately holding and releasing a ring in an animal's nose; an operating member located in the staff and adapted to operate said holding and releasing means; a wire connected to said member and leading to the opposite end of the staff; an elongated hook on the free end of the wire; and a trip having an enlarged loop on one end, and a hook on the other end, provided with a laterally extended point, the end of the trip having the hook being inserted in the end of the staff having the handle, so the laterally extended point will be placed along side the elongated hook on the wire, and by rotating the trip half way around in the staff, said laterally extended point will pass into and through the opening in the elongated hook on the wire, and the hook on the trip will be securely connected to the hook on the wire, substantially as described.

10. In a device of the character described, a tubular staff; a handle on one end of the staff, a slot in the portion of the handle covering the end of the staff, said slot having a lateral extension; means on the other end of the staff for alternately holding and releasing a ring in an animal's nose; an operating member located in the staff and adapted to operate said holding and releasing means; a wire connected to said member and leading to the opposite end of the staff; an elongated hook on the free end of the wire; a trip having an enlarged loop on one end and a hook on the other end provided with a laterally extended point, the end of the trip having the hook being inserted in the slot in the handle in the appropriate end of the tubular staff, the connecting portion of the handle being placed upon the appropriate end of the tubular staff, so that the laterally extended point will be placed along side the elongated hook on the wire, and by rotating the trip in the staff half way around in the staff the laterally extended point will pass into and through the opening in the elongated hook on the wire, and the hook on the trip will be securely connected to the hook on the wire substantially as and for the purpose set forth.

Fairfield, Iowa, July 12, 1922.

ALBERT H. NELLER.